United States Patent [19]

Cozzi et al.

[11] 4,250,039
[45] Feb. 10, 1981

[54] TRANSMISSION FILTER

[75] Inventors: John F. Cozzi, Carol Stream, Ill.;
Edward M. Maczko, Jr.,
Birmingham, Mich.

[73] Assignee: Wire Cloth Products, Inc., Bellwood, Ill.

[21] Appl. No.: 36,650

[22] Filed: May 7, 1979

[51] Int. Cl.³ ............................................. B01D 35/02
[52] U.S. Cl. ................................. 210/416.5; 210/452; 210/455; 210/462
[58] Field of Search ............ 55/376, 377, 380, DIG. 2; 156/73.1; 210/416 R, 406, 435, 451, , 416 L, 452, 455, 167, 168, 459, 460, 461, 462, 483, 486, 488, 497 R, 172, 23

[56] References Cited

U.S. PATENT DOCUMENTS

| 3,023,905 | 3/1962 | McDougal et al. | 210/172 |
| 3,108,065 | 10/1963 | McMichael | 210/172 |
| 3,419,151 | 12/1968 | Smith et al. | 210/460 |
| 3,785,970 | 1/1974 | Hodgkins | 210/23 |
| 3,875,059 | 4/1975 | Maschino | 210/460 |

FOREIGN PATENT DOCUMENTS 888835 2/1962 United Kingdom .

Primary Examiner—Frank Sever
Attorney, Agent, or Firm—Haight, Hofeldt, Davis & Jambor

[57] ABSTRACT

A transmission filter has a filter envelope located inside a sealed rigid container, with an intake port and a corresponding intake opening to the interior of the filter envelope located at the bottom of the container. A suction outlet port at the top of the container conveys transmission fluid passing through the filter envelope to the suction line of the transmission system. The filter envelope is formed of thermoplastic fiber felt, with two sheets or layers of the felt being ultrasonically welded to provide a continuous fluid-tight seal for the filter envelope. Ultrasonic welding of the felt is achieved by an apparatus and method that is also useful in other types of ultrasonic welding of thermoplastic fabrics. An ultrasonic horn to be vibrated at an ultrasonic frequency is provided with a knurled surface corresponding to the area to be welded. The ultrasonic horn presses a thermoplastic fabric against a stationary material to which it is to be welded, such as another sheet of the same fabric or another fabric the motion of which is limited by placing it on a knurled surface formed on a stationary plate.

6 Claims, 9 Drawing Figures

U.S. Patent  Feb. 10, 1981  Sheet 1 of 2  4,250,039
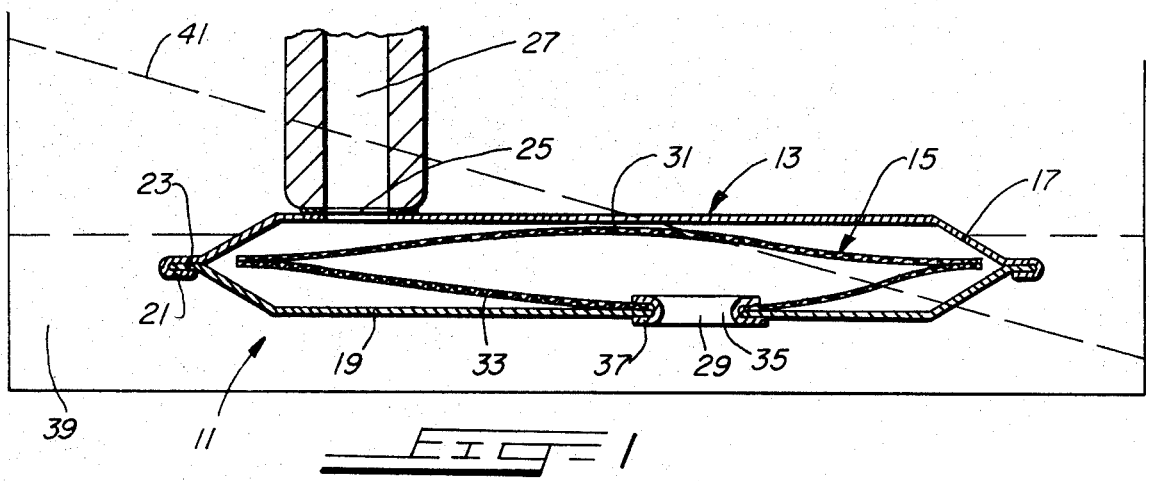
FIG. 1
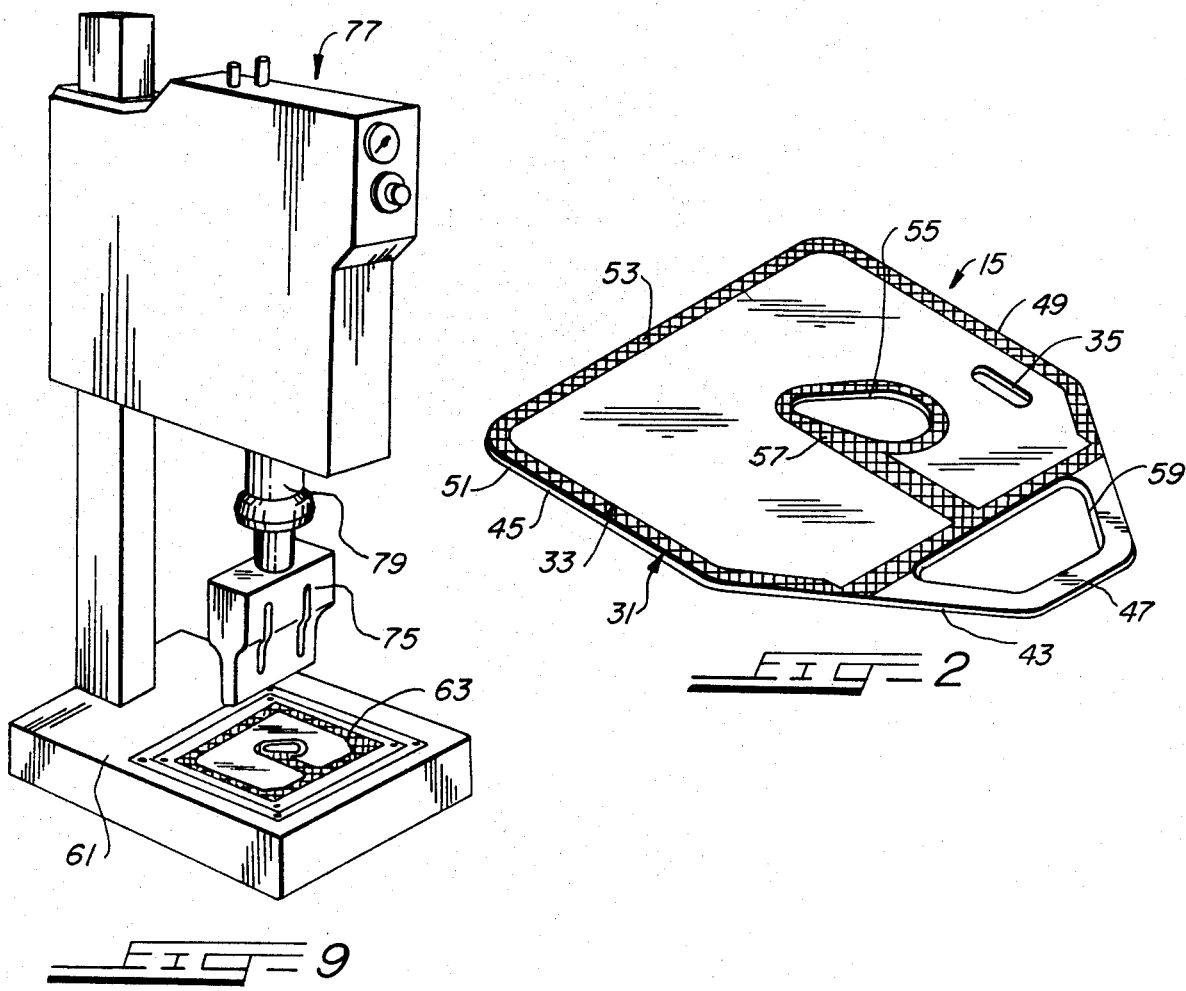
FIG. 2
FIG. 9

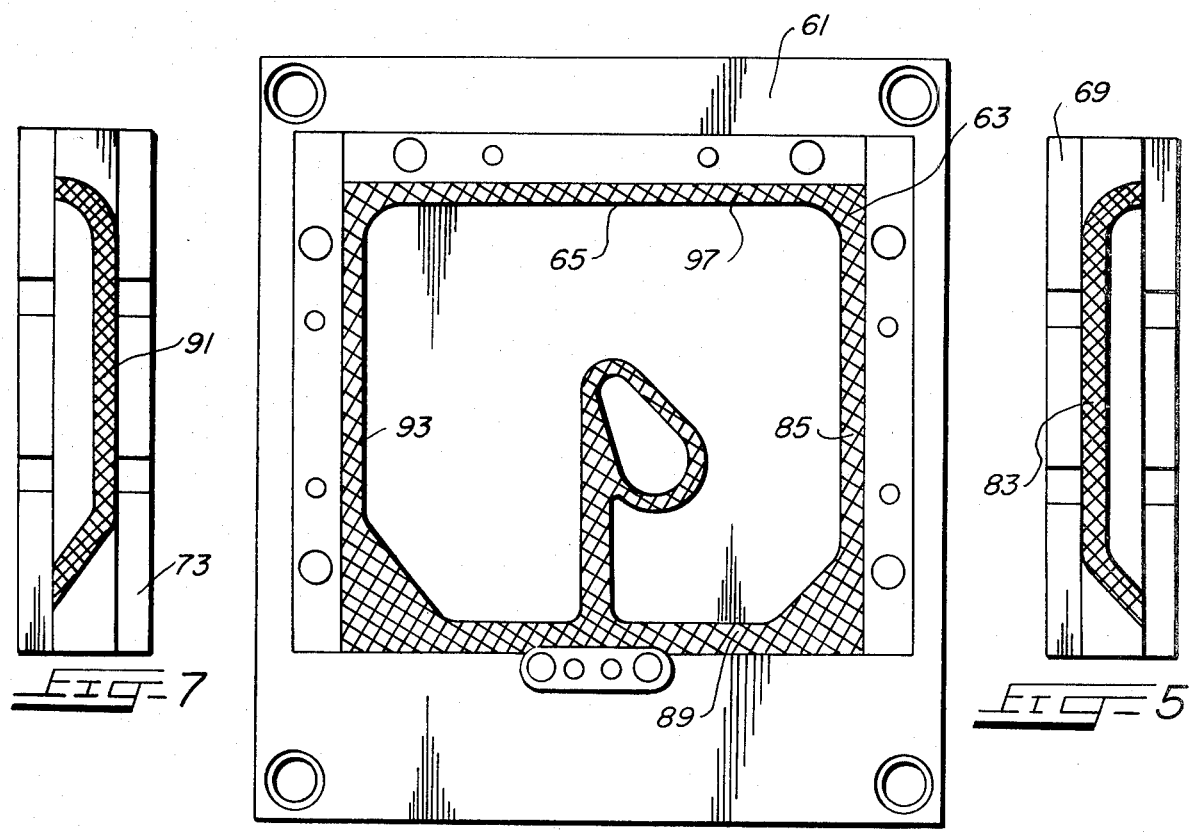

TRANSMISSION FILTER

CROSS-REFERENCE TO RELATED APPLICATION

This application is related to the application of John F. Cozzi entitled "Apparatus and Method for Ultrasonically Welding Fabrics" being filed concurrently herewith.

BACKGROUND OF THE INVENTION

1. Field of the Invention

This invention relates generally to a filter arrangement for use in automobile transmission systems and a method of making the filter, and more specifically, this invention relates to a transmission filter having a filter envelope formed by ultrasonically welding thermoplastic fiber felt, the filter envelope being located inside a rigid container.

2. Description of the Prior Art

Current automobile transmission filters are generally formed of two perforated metal plates covered by two sheets of filter material, such as a filtering felt. A metal binder is clamped around the periphery of the filter to hold the metal plates and the sheets of felt in a single structure. This filter structure is submerged in a reservoir of transmission fluid. A suction port leads to the suction line of the transmission system so that the transmission fluid is drawn in through the filtering felt and the perforations in the metal plates. This transmission fluid is then drawn into the suction line from the interior space defined by the metal plates.

This type of structure has some disadvantages. For one thing, as a suction vacuum is created in the interior of the filter the felt is drawn into the perforations of the metal plate to restrict the flow of transmission fluid into the filter. Also, with this type of structure any contaminants are trapped on the outer surface of the filter and are free to re-circulate within the reservoir of transmission fluid.

Another problem with the structure currently used is that as an automobile goes up or down an inclined grade the fluid level in the reservoir is inclined so that a portion of the filter may be exposed to the air, which results in the undesired inclusion of air in the fluid passing into the suction line. In order to prevent the intake of air into the transmission suction line, it is necessary to maintain a relatively large reservoir of transmission fluid, with the attendant cost.

In attempting to solve these problems, the inventors of the current application devised a structure employing a filter envelope located in a rigid or metallic container. While any suitable type of approach could be utilized to form the filter envelope from the layers or sheets of felt, it was decided that ultrasonic welding would be especially desirable to provide the desired sealing connection between the sheets or layers of felt. However, it was discovered that there were a number of difficulties in obtaining the desired ultrasonic weld.

As ultrasonic welding involves a mechanical vibration to produce a friction heat to induce bonding, it means that one layer or sheet of the felt moves relative to the other layer or sheet in the area where it is desired to achieve a weld joint. Damping or limiting the relative motion of one layer or sheet while the other is being ultrasonically vibrated is difficult, in view of the fact that the clamping pressure is being supplied by the ultrasonic horn contacting the non-stationary layer of felt, which tends to produce movement in both layers of felt. Thus, it is very difficult to accurately define the weld area. Also, without the desired amount of damping of the relatively stationary layer or felt, the heat of welding is hard to control and burn-out tends to result. Further, variations in the density or thickness of the felt layers can create serious difficulties in obtaining an appropriate weld.

SUMMARY OF THE INVENTION

The present approach provides an improved transmission filter and obviates the problems of prior art ultrasonic welding techniques. With the transmission filter disclosed herein, a sealed rigid container, such as a container formed of two metallic sections, has a filter envelope located therein. An intake port, which may be in the form of an oblong, is located in the bottom of the rigid container. A suction outlet port is located in the top of the rigid container in fluid alignment with the suction line of the transmission system, in order to permit transmission fluid to be conveyed from the rigid container to the suction line.

An intake opening, matching the intake port in the container, is formed in the filter envelope. A suitable attaching arrangement is provided to secure a part of the filter envelope about the intake opening to a part of the container about the intake port with a fluid-tight seal. This attaching arrangement may take any suitable form, such as a metal eyelet crimped over the appropriate parts of the filter envelope and the container. When the filter is located in a reservoir of transmission fluid, the only path for the transmission fluid to reach the interior of the container is to pass through the intake port and the filter material of the filter envelope.

With a filter structure of this type, the suction in the container expands the filter and completely eliminates the problem of restricted flow that is encountered with prior art types of filters. Also, with this structure any contaminants in the transmission fluid are trapped in the filter envelope, which may be relatively easily replaced, as opposed to remaining in the reservoir of transmission fluid. Still further, since the intake port is in the bottom of the filter container, and since the container is sealed, the level of transmission fluid would have to be much lower before an inclination of the fluid would result in air being drawn into the transmission line. Accordingly, less transmission filter is required, with the attendant savings in transmission fluid and costs.

Any desired shape may be provided for the filter envelope. In the preferred embodiment disclosed herein, the filter envelope is formed to have a generally triangularly shaped portion with its base along one end of a generally rectangularly shaped portion. The apex of the generally triangularly shaped portion is rounded, while one side of the generally rectangularly shaped portion is longer than the other to ensure that the filter envelope is properly placed during assembly.

To construct the filter envelope, two layers or sheets of a suitable filter material, such as a felt are employed. Only one of the sheets or layers has the shape described in the preceding paragraph, as the other layer does not have a part of the triangularly shaped portion. Accordingly, this other layer has a generally rectangularly shaped portion that corresponds to the generally rectangularly shaped portion of the first layer. However, it only has a truncated section along the base of the triangularly shaped portion. The joint to form the actual filtering envelope is located about this smaller layer.

A generally trapezoidal hole is formed in the triangularly shaped portion of the first layer that extends beyond the joint between the two layers of felt. This opening is to facilitate flow of transmission fluid from both sides of the envelope to the suction line of the transmission system. Another, generally pear-shaped, opening is formed through both layers of felt to permit the passage of a mounting bolt. An appropriate seal is located about this pear-shaped opening.

To provide the desired seal between the two layers of felt, ultrasonic welding is employed. Thus, the felt for the filter envelope is constructed from suitable thermoplastic fibers that permit utilization of the ultrasonic welding technique.

In order to achieve the ultrasonic welding, it is necessary that one of the layers of fabric, in this instance the filtering felt sheets, must have its motion limited with respect to the other layer. This is achieved by forming a knurled surface on a stationary plate. When one of the layers of fabrics is located on this knurled plate, the extent of its motion is greatly limited. While the entire surface of the stationary plate could be knurled, it has been found advantageous to provide raised ridges to define a pattern of one or more weld areas along which the two layers of fabric will be joined. These raised ridges have knurled surfaces so that the layer of fabric is maintaned relatively stationary at the weld areas.

The other layer of fabric is placed over the layer of fabric on the stationary plate, and an ultrasonic horn is pressed against this second layer of fabric, and hence the underlying stationary plate, to create a predetermined pressure on the layers of fabric. The horn has a knurled surface corresponding to a weld area, so that the pressure is developed in the weld area.

A suitable ultrasonic device is then utilized to vibrate the ultrasonic horn at a predetermined ultrasonic frequency. The knurled surface on the ultrasonic horn engages the second layer of fabric to move it with respect to the relatively stationary layer of fabric and hence produce the requisite heat for forming a bond between the two layers of fabric at the weld area.

If more than one weld area is involved in the pattern defined on the stationary plate, a plurality of ultrasonic horns may be provided for the individual weld areas. Welding of the various weld areas would then normally be effected by sequentially advancing the fabrics to ultrasonic machines having the various ultrasonic horns required to complete the entire pattern.

By utilization of the ultrasonic welding techniques described herein, it is possible to accurately define the weld area and to greatly minimize the burn-out problem. In addition, varying densities or thicknesses of the fabrics can be accomodated without adversely affecting the quality of the ultrasonic weld joints.

These and other objects, advantages and features of this invention will hereinafter appear, and for purposes of illustration, but not of limitation, and exemplary embodiment of the claimed invention is shown in the appended drawing.

BRIEF DESCRIPTION OF THE DRAWING

FIG. 1 is a schematic cross-sectional view of a transmission filter constructed in accordance with the present invention.

FIG. 2 is a perspective view of a filter envelope constructed in accordance with the present invention.

FIG. 3 is a plan view of a stationary weld plate constructed in accordance with the present invention.

FIGS. 4-8 are plan views of knurled surfaces on various ultrasonic horns constructed in accordance with the present invention.

FIG. 9 is a schematic perspective view of an ultrasonic machine utilized in achieving the ultrasonic welding of the present invention.

DETAILED DESCRIPTION OF THE PREFERRED EMBODIMENT

A somewhat schematic version of a transmission filter 11 constructed in accordance with the present invention is illustrated in FIG. 1. Transmission filter 11 has a rigid container 13 in which a filter envelope 15 is mounted. Container 13 may be made of any suitable rigid material, such as an appropriate metal. Container 13 could be a unitary piece, but in this preferred embodiment it is illustrated as having two sections 17 and 19. Sections 17 and 19 are joined together to form a fluid-tight seal by means of crimping an edge 21 of one of the sections (in the illustrated case section 17), over an appropriate mating edge 23 on the other section (in the illustrated case section 19). Although not illustrated in FIG. 1, the sealing effect may be enhanced by extending the edges of the filter envelope 15 to be crimped between the metallic edges 21 and 23.

A suction outlet port 25 is formed in the top section 17 of container 13. Suction outlet port 25 is in fluid alignment with a suction line 27 of the transmission system. An intake port 29 is formed in the bottom section 19 of container 13.

Filter envelope 15 is formed of two layers or sheets 31 and 33 of filtering felt. Bottom layer 33 has an intake opening 35 formed therein that matches the intake port 29 formed in section 19 of container 13. The part of envelope 15 about intake opening 35 is sealed to the part of the container 13 about intake port 29 to ensure that the only transmission fluid reaching the interior of container 13 must pass through the filter material (felt) of envelope 15.

When filter 11 is submerged, wholly or partially, in a reservoir 39 of transmission fluid, transmission fluid passes through intake port 29 and intake opening 35 to the interior of the filter envelope 15. The suction in line 27 pulls the transmission fluid through the filtering felt of envelope 15 and out suction outlet port 25.

Not only does this filter prevent the collapsing of the filter material to restrict fluid flow, it also provides that any contaminants are collected inside the filter envelope 15, so that they are removed from the reservoir 39 of transmission fluid. Also, smaller amounts of transmission fluid may be utilized without fear of air being pulled into the transmission system. This latter advantage is illustrated by the line 41, which illustrates the condition of the transmission fluid in the event that the automobile is on an inclined grade. With the previous type of transmission filter, the exposure of some of the filter 11 to the air would have resulted in air being sucked into the transmission system. However, as may be noted from the position of line 41, intake port 29 is still completely covered by fluid under these conditions. Since the container 13 is sealed, no air can reach the transmission system under these circumstances.

In FIG. 2 there is depicted a filter envelope 15 having a preferred shape or contour. The layer of filtering felt 31 has a generally triangularly shaped portion 43 with its base along one end of a generally rectangularly shaped portion 45. Apex 47 of generally triangularly shaped portion 43 is rounded. Also, side 49 of the generally rectangularly shaped portion 45 is longer than the side 51 thereof. This slight distortion of the shape ensures that the filter envelope 15 will be properly positioned in the container 13 during assembly.

While filtering felt layer 33 has a generally rectangular portion that matches the generally rectangular portion of layer 31, the triangularly shaped portion is somewhat truncated so that only a part adjacent the base of the triangular shaped portion 43 of layer 31 has a corresponding part in layer 33. The ultrasonic weld joint 53 is formed about the periphery of layer 33.

A generally pear-shaped opening 55 is formed through both of the felt layers 31 and 33. The purpose of this generally pear-shaped opening is to receive or permit the mounting bolt for the filter 11 to pass through filter envelope 15. The area about pear-shaped opening 55 is also ultrasonically welded to provide a seal.

It may be noted that the inlet opening 35 has a generally oblong shape, and the intake port 29 would have a generally corresponding shape. A generally trapezoidal hole 59 is located in the generally triangularly shaped portion 43 of layer 31. The purpose of this hole 59 is to permit transmission fluid on either side of the filter envelope 15 to be withdrawn through the suction outlet port 25.

Ultrasonic welding of the felt layers 31 and 33 may be achieved if appropriate thermoplastic fibers are utilized in the formation of these felts. In order to achieve the ultrasonic welding, a stationary plate 61 is utilized. In order to maintain one of the layers of felt, more generally described as a fabric, relatively stationary with respect to the other layer, a knurled surface 63 is provided. This knurled surface may take any appropriate form, provided that the roughened or knurled surface will engage the fabric layer to limit the motion of that layer with respect to the overlying layer during ultrasonic welding. While the entire surface of plate 61 could be knurled to hold the fabric, it has been found desirable to provide raised ridges 65. The raised ridge or ridges 65 define a pattern of one or more weld areas where the layers of fabric are to be joined. In the case of the filter envelope 15 illustrated herein, a series of five weld areas are incorporated in the pattern defined by ridge 65.

To perform the ultrasonic welding process, an ultrasonic horn, which is a vibrating tool, is utilized. Five such ultrasonic horns are illustrated in FIGS. 4-8, which correspond to the five weld areas for the filter envelope 15. FIG. 4 illustrates an ultrasonic horn 67 for utilizing and providing the weld joint about pear-shaped openings 55, while FIGS. 5-8 show ultrasonic horn 69, 71, 73 and 75 utilized in welding the sides of envelope 15.

To perform the ultrasonic welding at the weld areas, an ultrasonic machine, such as that depicted generally at 77, is utilized. These machines 77 have an ultrasonic signal input from a generator (not shown) which is converted into mechanical vibrations by a transducer in machine 77. These mechanical vibrations are conveyed to a booster 79 to control the amplitude of the ultrasonic vibrations. These ultrasonic mechanical vibrations are conveyed to an ultrasonic horn, depicted here as horn 75. A suitable press arrangement, normally pneumatic, is included in the machine 77.

When it is desired to perform an electronic welding operation, a first sheet or layer of fabric is located on the stationary plate 61. A second layer of the fabric is placed over the first layer and an ultrasonic horn is brought to bear against the second layer. A predetermined pressure on the layers of fabric is established by pressing the ultrasonic horn toward the stationary plate. The horn is then ultrasonically vibrated to form the desired connecting joint between the fabrics at the weld area corresponding to that horn.

When there are multiple weld areas, with different horns, the ultrasonic welding will be performed in successive steps. In the case of the particular filter envelope disclosed herein, it may be seen that the horn 67 has a knurled surface 81 formed thereon for providing the ultrasonic weld joint about the generally pear-shaped openings 55. This knurled surface, as is true of each of the ultrasonic horns, may be of any suitable structure that will engage the second layer of fabric during the welding process to vibrate that layer of fabric at the desired ultrasonic frequency. The heat of friction formed between the first and second layers of fabric results in the production of the desired connecting weld joint. Continuing on with FIGS. 5-8, it may be seen that the knurled surface 83 on horn 69 corresponds to the weld area of side 85 on ridge 65. Similarly, the knurled surface 87 on horn 71 corresponds to side 89 in the pattern of ridge 65, knurled surface 91 on horn 73 corresponds to side 93, and knurled surface 95 on horn 75 corresponds to side 97.

It should be understood that various modifications, changes and variations may be in the arrangement, operation and details of construction of the elements disclosed herein without departing from the spirit and scope of this invention.

We claim:

1. A transmission filter comprising:
    a rigid non-perforated container sealed to prevent direct entry of transmission fluid to the interior of said container when said container is submerged in the transmission fluid;
    an intake port formed in the bottom of said container;
    a suction outlet port formed in the top of said container, said container being adapted to be mounted with said suction outlet port in fluid conveying alignment with the suction line of the transmission system;
    a filter envelope positioned inside said container, said filter envelope having a continuous seal to preclude passage of transmission fluid other than through the filter material itself;
    an intake opening formed in said filter envelope to match said intake port to permit unfiltered transmission fluid to pass to the interior of said filter envelope only through the bottom of said container; and
    attaching means to sealingly secure said intake opening of said filter envelope in alignment with said intake port of said container to permit transmission fluid to reach the interior of said container outside said filter envelope for removal out said suction outlet port only after passing through the filter material of said filter envelope.

2. A transmission filter as claimed in claim 1 wherein said filter envelope is formed of two sheets of thermoplastic fiber felt which are joined together with a continuous seal by ultrasonic welding.

3. A transmission filter as claimed in claim 2 wherein the portion of said filter envelope about an opening extending through said filter envelope to receive a mounting bolt for the filter is ultrasonically welded to form a continuous seal.

4. A transmission filter as claimed in claim 1 wherein said attaching means comprises a metal eyelet crimped over the portion of said container about said intake port and the portion of said filter envelope about said intake opening.

5. A transmission filter as claimed in claim 1 wherein said filter envelope has the shape of a generally triangularly shaped portion with its base along one end of a generally rectangularly shaped portion, said generally triangularly shaped portion having a rounded apex and said generally rectangularly shaped portion having one side longer than the other to ensure proper assembly, with only a part of the generally triangularly shaped portion adjacent the base thereof being formed from both layers of felt.

6. A transmission filter comprising:
- a rigid metallic non-perforated container crimped about the outer edges thereof to provide a fluid-tight seal that prevents direct entry of transmission fluid to the interior of said container when said container is submerged in the transmission fluid;
- a generally oblong intake port formed in the bottom of said container;
- a suction outlet port formed in the top of said container, said container being adapted to be mounted with said suction outlet port in fluid conveying alignment with the suction line of the transmission system;
- a first sheet of thermoplastic fiber felt having the shape of a generally triangularly shaped portion with its base along one end of a generally rectangularly shaped portion, said generally triangularly shaped portion having a rounded apex and said generally reactangularly shaped portion having one side longer than the other;
- a second sheet of thermoplastic fiber felt having a generally rectangularly shaped portion corresponding to the generally rectangularly shaped portion of said first sheet and a truncated base portion of a generally triangularly shaped portion corresponding to a part adjacent the base of the generally rectangularly shaped portion of said first sheet;
- a continuously sealed connecting joint formed between said sheets of thermoplastic fiber felt as the result of an ultrasonic weld between said sheets and located about the periphery of the shape defined by said second sheet to form a filter envelope, said filter envelope being located inside said container;
- a generally oblong intake opening formed in said second sheet to match said intake port;
- a metal eyelet crimped over the parts of said second sheet of felt and the bottom of said container about said intake opening and said intake port respectively to permit unfiltered transmission fluid to reach the interior of the filter envelope formed by the ultrasonic welding of said sheets of thermoplastic fiber felt only through the bottom of said container, the transmission fluid being filtered through said filter envelope before passing out said suction outlet port;
- a generally trapezoidal opening formed in the generally triangularly shaped portion of said first sheet of fiber felt beyond where said sheets are ultrasonically welded together to permit flow of transmission fluid to said suction outlet port from either side of said filter envelope; and
- matching pear-shaped openings formed in said sheets of fiber felt to receive a mounting bolt for the filter, the portion about said pear-shaped openings being ultrasonically welded to provide a continuous seal.

* * * * *